United States Patent [19]
Winckler et al.

[11] Patent Number: 4,971,440
[45] Date of Patent: Nov. 20, 1990

[54] PROJECTION OF TWO ORTHOGONAL REFERENCE LIGHT PLANES

[75] Inventors: Peter S. Winckler, Dayton; Daniel R. Klemer, Centerville; John P. Dugan, Fairfield, all of Ohio

[73] Assignee: Spectra-Physics, Inc., San Jose, Calif.

[21] Appl. No.: 447,792

[22] Filed: Dec. 8, 1989

[51] Int. Cl.$^5$ ............................................. G01B 11/26
[52] U.S. Cl. .................................... 356/138; 356/152; 350/286; 350/618; 350/171
[58] Field of Search ...................... 356/138, 152, 400; 350/171, 172, 286, 618, 622; 33/290, DIG. 21, 276

[56] References Cited

U.S. PATENT DOCUMENTS

| | | | |
|---|---|---|---|
| 3,588,249 | 6/1971 | Studebaker | 356/4 |
| 3,813,171 | 5/1974 | Teach et al. | 356/152 |
| 3,820,903 | 6/1974 | Kindl et al. | 356/138 |
| 4,031,629 | 6/1977 | Paluck | 33/290 |
| 4,035,084 | 7/1977 | Ramsay | 356/152 |
| 4,062,634 | 12/1977 | Rando et al. | 356/248 |
| 4,441,818 | 4/1984 | Wickman | 356/372 |
| 4,676,598 | 6/1987 | Markley et al. | 350/171 |
| 4,679,937 | 7/1987 | Cain et al. | 356/138 |
| 4,732,471 | 3/1988 | Cain et al. | 356/152 |
| 4,770,480 | 9/1988 | Teach | 350/286 |
| 4,836,669 | 6/1989 | Teach | 350/618 |

Primary Examiner—F. L. Evans
Attorney, Agent, or Firm—Killworth, Gottman, Hagan & Schaeff

[57] ABSTRACT

An orthogonal light plane generator is associated with a primary light plane generator to convert a portion of a first light plane projected by the primary light plane generator into a second light plane substantially orthogonal to the first light plane. The orthogonal light plane generator comprises a diverter which defines three or more reflecting surfaces for receiving a portion of the first light plane and redirecting that portion as the second light plane. The three or more reflective surfaces are oriented relative to one another such that tilting of the orthogonal light plane generator is compensated to maintain the orthogonality between the two light planes. Tilting about one axis results in offset of the second light plane and tilting about a second axis orthogonal to the first results in a shifting of the sector within which the second light plane is projected, but tilting about either axis does not affect the orthogonality between the planes. Preferably the three or more reflective surfaces are defined by one or more prisms formed of an optical material having an index of refraction which enlarges the sector angle encompassed by the second light plane when compared to mirrored surfaces supported within air. The performance of the diverter can be further enhanced by optical devices positioned at its input and/or output. The optical devices can be one or more conventional lenses or angled wedges of optical material.

22 Claims, 11 Drawing Sheets

PROJECTION OF TWO ORTHOGONAL REFERENCE LIGHT PLANES

BACKGROUND OF THE INVENTION

The present invention relates generally to the projection of light planes used in the construction industry and, more particularly, to the projection of two reference light planes which are substantially orthogonal to one another, are generated from a single light source and wherein a portion of a first reference light plane is converted to a substantially orthogonal second light plane by a light diverter comprising at least three reflective surfaces oriented relative to one another such that tilting the light diverter about a first axis is compensated to maintain the second light plane orthogonal to the first light plane and tilting the light diverter about a second axis orthogonal to the first axis shifts a sector within which the second light plane is projected but not the orthogonality of the first and second light planes.

Reference light planes, typically using laser light, are employed in numerous surveying and construction applications. Such light planes can be projected throughout a work site to substantially continuously monitor and/or control the vertical height of working surfaces of machines operating within the work site relative to the planes. Reference light planes can be generated by rotating laser beam devices, such as those disclosed in U. S. Pat. Nos. 4,062,634, 4,035,084 and 4,031,629, by a reflecting cone, such as those disclosed in U.S. Pat. Nos. 3,820,903 and 4,679,937 or by other appropriate devices.

Oftentimes, it is desirable to control not only the vertical height of working surfaces of such machines but also the direction of movement of the machines in relation, respectively, to predefined horizontal and vertical reference light planes. While this can be done by providing two of the devices disclosed in the above noted patents, preferably a pair of reference planes can be provided from a single light or laser source. For example, two orthogonal reference light planes are generated from a single laser source by the devices disclosed in U.S. Pat. Nos. 3,813,171 and 4,836,669 with the orthogonal reference light planes of U.S. Pat. No. 3,813,171 being most effective for machine control since both a work site encompassing horizontal light plane and a sector of a vertical light plane are provided.

While the device of U.S. Pat. No. 3,813,171 generates two reference planes from a single light source and hence is less expensive and a substantial improvement over using two individual light plane generators, unfortunately, the vertical plane generator does not correct for errors due to tilting it relative to the horizontal plane which is its source. Accordingly, the vertical light plane generator must be carefully leveled relative to the horizontal plane generator since if the vertical plane generator is tilted relative to the horizontal plane generator, severe errors result in the orthogonality between the two reference planes.

Thus, there is a need for a reference light plane projector which can generate two orthogonal reference planes of light, such as horizontal and vertical light planes, from a single light source which projector is not dependent on precise leveling of a second light plane generator relative to a first light plane generator even though it generates the second light plane from a portion of the first light plane. The second light plane generator of the projector preferably would compensate for tilt errors such that its orientation relative to the first light plane generator would not be critical for the generation and projection of the two orthogonal reference light planes.

SUMMARY OF THE INVENTION

This need is met in accordance with the present invention wherein an orthogonal light plane generator is associated with a primary light plane generator to convert a portion of a first reference light plane into a second orthogonal reference light plane. The orthogonal light plane generator comprises light diverting means which define three or more reflecting surfaces for receiving a portion of the first reference light plane and redirecting that portion as the second orthogonal reference light plane. The three or more reflective surfaces are oriented relative to one another such that tilting of the orthogonal light plane generator about one axis is compensated to maintain the orthogonal relation between the two light planes and tilting about a second axis orthogonal to the first results in a shifting of the sector within which the second light plane is projected but does not affect its orthogonal relation to the first light plane. Preferably the three or more reflective surfaces are defined by one or more prisms formed of an optical material having an index of refraction which enlarges the sector angle encompassed by the second light plane when compared to mirrored surfaces supported within air. The performance of the light diverting means can be further enhanced by optical means positioned at its input and/or output. The optical means can be one or more conventional lenses or angled wedges of optical material.

In accordance with one aspect of the present invention, apparatus for projecting light in two orthogonal planes to provide reference planes for use in laying out a construction site or the like comprises light source means for generating a first light plane and light diverting means for receiving a portion of the first light plane generated by the light source means and transforming the received portion of the first light plane into a second light plane which is orthogonal to the first light plane. The second light plane is projected within an angular sector defined by the light diverting means which comprises at least three reflective surfaces. The at least three reflective surfaces are oriented relative to one another such that tilting the light diverting means about a first axis is compensated to maintain the second light plane orthogonal to the first light plane and tilting the light diverting means about a second axis orthogonal to the first axis alters the sector within which the second light plane is projected but not the orthogonality of the first and second light planes.

The apparatus may further comprise optical means coupled to the light diverting means for adjusting the sector within which the second light plane is projected. The optical means may comprise a telescope having a first lens coupled to the light diverting means for receiving the portion of the first light plane therethrough and a second lens coupled to the light diverting means for projecting the second light plane therethrough, the sector within which the second light plane is projected being defined by the light diverting means and the first and second lenses. Alternately, the optical means may comprise an input and/or an output wedge shaped section of optical material which is coupled to the light diverting means for receiving the first light plane therethrough and/or projecting the second light plane therethrough. The sector within which the second light plane is projected is then defined by the light diverting means and the input and/or output wedge shaped sections of optical material.

Preferably, the light diverting means is made as one or a combination of two or more prisms. When two or more prisms are used, the prisms may be secured together to calibrate the light diverting means and preferably are bonded together using optical adhesive activated, for example, by ultraviolet light. By making the light diverting means prismatic, i.e. made up of one or more prisms, the construction can be simplified and the sector angle encompassed by the second light plane can be enlarged as compared to that obtained by a similarly sized light diverting means constructed of mirrors or other reflective surfaces supported within air. The enhanced operation of prismatic light diverting means is due to the refraction of light beams passing through the device.

In one illustrative embodiment, the light diverting means comprises two pairs of reflective surfaces. A first pair of reflective surfaces receives the portion of the first light plane and passes it to a second pair of reflective surfaces which receives light from the first pair of reflective surfaces and projects it as the second light plane. While this embodiment of the light diverting means may be constructed in the form of a single prism, it may also be constructed as a "two part" prism having an input prism defining one of the reflective surfaces and an output prism defining second, third and fourth reflective surfaces. In the two part configuration, the input and output prisms are secured together and preferably bonded to one another with sufficient optical quality and in proper alignment to calibrate the light diverting means.

In another illustrative embodiment, the light diverting means comprises three reflective surfaces. A first of the reflective surfaces receives the portion of the first light plane, a second of the reflective surfaces projects the second light plane, and a third of the reflective surfaces receives light from the first reflective surface and reflects it to the second reflective surface. This embodiment of the light diverting means may also be constructed in the form of a single prism or as at least two prisms. In a two prism construction, an input prism defines one of the reflective surfaces and an output prism defines the second and third reflective surfaces. Here too, the input and output prisms are secured together and preferably adhesively bonded to one another with sufficient optical quality and in proper alignment thus allowing economic manufacture and ease of calibration of the light diverting means.

It is thus an object of the present invention to provide a tilt compensating light plane generator which converts a portion of a first light plane into a second light plane substantially orthogonal to the first light plane without requiring precise orientation of the light plane generator relative to the first light plane; to provide a tilt compensating light plane generator which includes light diverting means comprising three or more reflective surfaces for receiving a portion of a first light plane and converting it into a second light plane substantially orthogonal to the first light plane without requiring precise orientation of the light diverting means relative to the first light plane; to provide a tilt compensating light plane generator which includes prismatic light diverting means for receiving a portion of a first light plane and converting it into a second light plane substantially orthogonal to the first light plane without requiring precise orientation of the light diverting means relative to the first light plane and wherein the sector angle of the second light plane is expanded due to the refraction of light beams within the light diverting means; and, to provide a tilt compensating light plane generator which includes light diverting means for receiving a portion of a first light plane and converting it into a second light plane substantially orthogonal to the first light plane without requiring precise orientation of the light diverting means relative to the first light plane and wherein the sector angle of the second light plane is expanded by optical means associated with the light diverting means.

Other objects and advantages of the invention will be apparent from the following description, the accompanying drawings and the appended claims.

FIG. 3 is a perspective view of an output prism which in combination with the input prism of FIG. 2 forms a two prism construction of the orthogonal light plane projector of FIG. 1, with FIGS. 3A, 3B, 3C and 3D being front, top, side and back views, respectively, with orthographic projections of various faces of the output prism extending from FIGS. 3A, 3B and 3C;

DETAILED DESCRIPTION OF THE INVENTION

Figure 1:
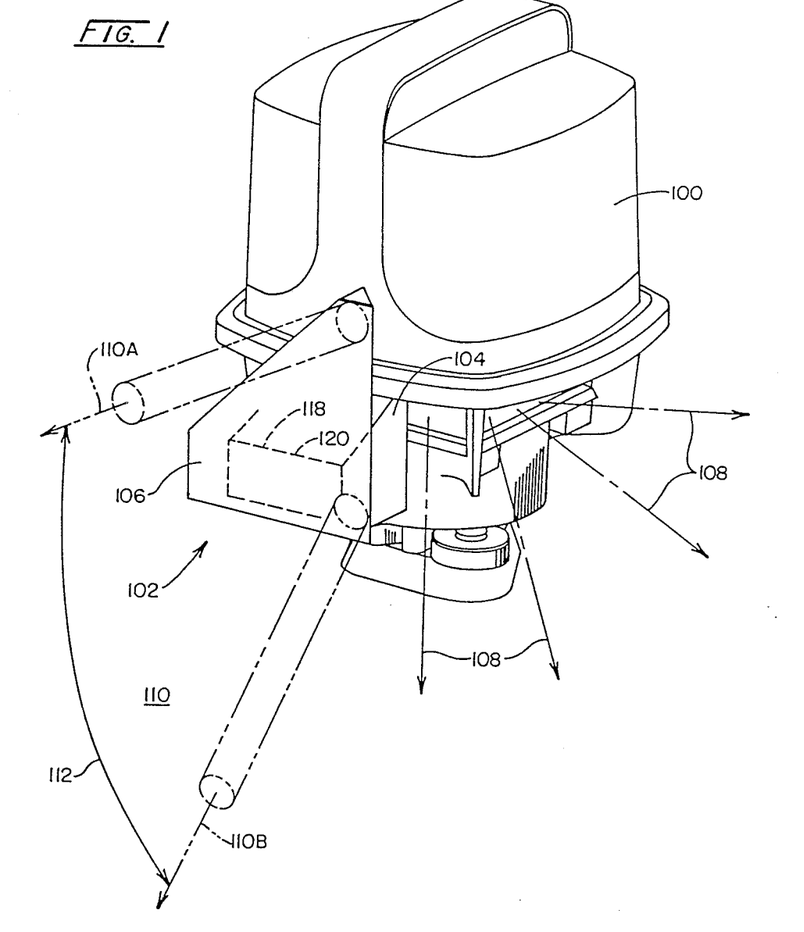
FIG. 1 is a perspective view of a commercially available reference light plane generator incorporating a first embodiment of a light diverting orthogonal light plane projector in accordance with the present invention.

FIG. 1 illustrates in perspective view light source means comprising a reference light plane generator 100 which is commercially available from Spectra-Physics, Inc., the assignee of the present application, and light diverting means coupled to the generator 100. The light diverting means is prismatic in the illustrated embodiment and comprises a diverter 102 which is constructed by joining an input prism 104 shown in FIGS. 2-2C to an output prism 106 shown in FIGS. 3-3D. As will become apparent, a prismatic construction of the diverter 102 is generally preferred; however, the diverter 102 can be constructed of other mirrored or reflective surfaces positioned for example in air to correspond to reflective surfaces within one or more prisms as illustrated herein.

The diverter 102 receives a portion of a first light plane 108 represented by light rays in FIG. 1 generated by the light plane generator 100 and transforms the received portion of the first light plane 108 into a second light plane 110. The second light plane 110 is substantially orthogonal to the first light plane 108 and is projected within an angular sector 112 extending between light rays 110A and 110B which is defined by the light diverter 102 in the illustrated embodiment.

Light diverting means of the present invention comprises at least three reflective surfaces oriented relative to one another such that tilting about a first axis is compensated to maintain the second light plane 110 orthogonal to the first light plane 108 and tilting about a second axis orthogonal to the first axis shifts the sector 112 within which the second light plane 110 is projected but not the orthogonality of the first and second light planes 108, 110.

Figure 2:
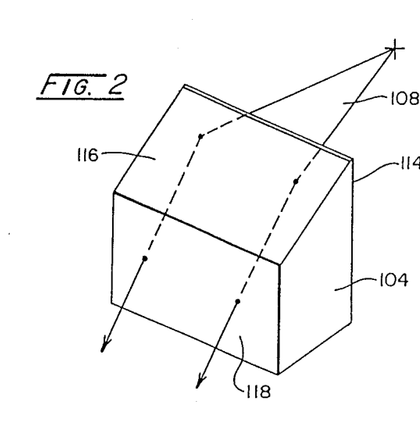
FIG. 2 is a perspective view of an input prism for a two prism construction of the orthogonal light plane projector of FIG. 1, with FIGS. 2A, 2B and 2C being back, side and front views, respectively, with an orthographic projection of an upper face of the input prism extending from FIG. 2B.
Figures 2A, 2B:
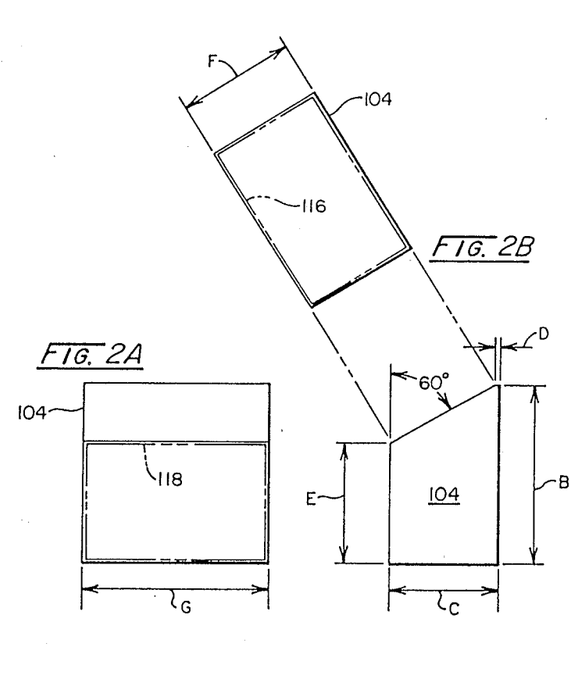
Figure 2C:
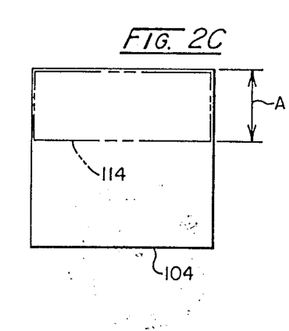
Figures 3, 3A, 3B, 3C, 3D:
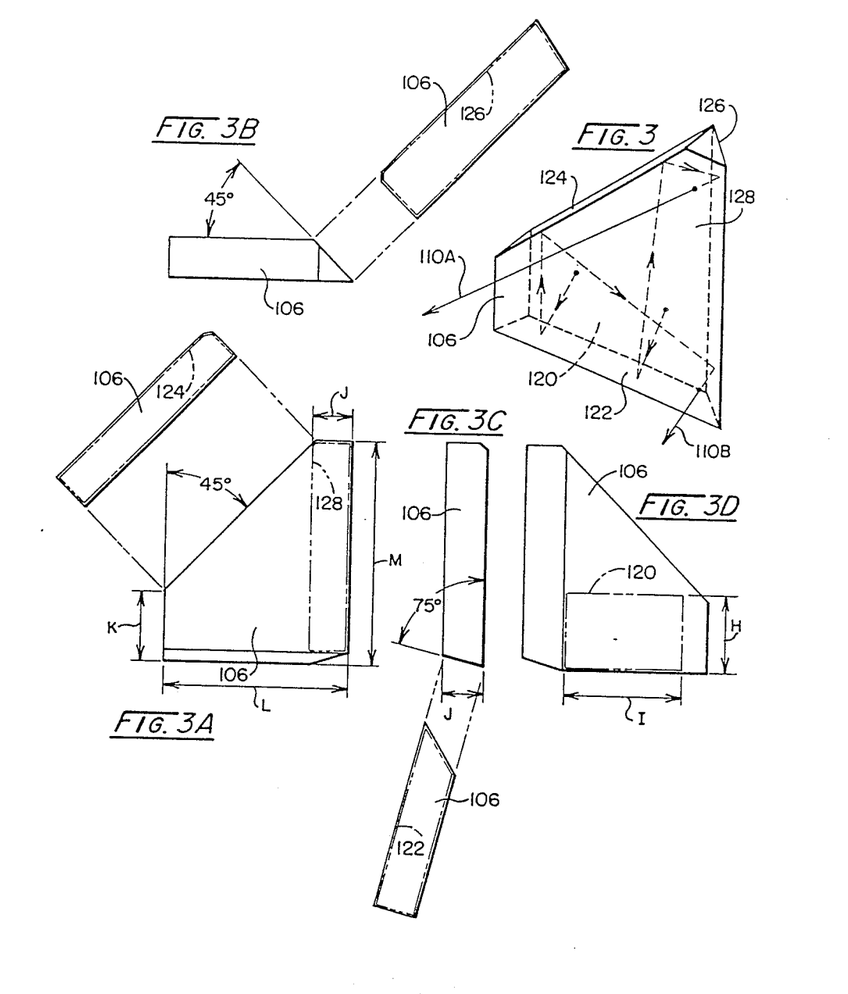

In the embodiment of the diverter 102 shown in FIGS. 1-3, the diverter 102 comprises four reflective surfaces. As shown in FIG. 2, the input prism 104 comprises three clear apertures, a first clear aperture 114 through which the portion of the first light plane 108 enters, a second clear aperture 116 which provides substantially complete internal reflection of the received portion of the first light plane 108 such that it passes through the third clear aperture 118, see FIGS. 2-2C. The dimensions of one working embodiment of the input prism 104 are as follows: A=26 mm; B=65 mm; C=39 mm; D=2 mm(ref); E=43.7 mm; F=42.7 mm(ref); and G=67 mm.

As shown in FIGS. 3-3D, the output prism 106 comprises five clear apertures, a first clear aperture 120 receives light beams from the input prism 104 which is joined to the output prism 106 such that the third clear aperture 118 of the input prism 104 is aligned with and secured to the first clear aperture 120 of the output prism 106. The prisms 104, 106 can be joined or secured to one another by ultraviolet cured optical adhesive or by other optical bonding techniques as will be apparent to those skilled in the art. By constructing the diverter 102 as two prisms 104, 106, the prisms can be shifted and aligned with one another to calibrate the diverter 102 prior to securing the prisms 104, 106 together. Such calibration substantially reduces the angular tolerances required between surfaces and thereby greatly reduces the cost of the diverter 102. The remaining clear apertures of the output prism 106 are: a second clear aperture 122; a third clear aperture 124; a fourth clear aperture 126; and, a fifth clear aperture 128. The reflectivity provided at the clear apertures presently appears to be satisfactory due to total internal reflection in most configurations; however, due to environmental considerations or designs with small angles of incidence, it may be necessary or desirable to provide reflectively coated surfaces at one or more of the clear apertures. For example, it is necessary to provide a reflectively coated surface at the clear aperture 122 shown in FIG. 3 with most optical materials.

Light enters the first clear aperture 120 of the output prism 106 from the input prism 104 and is substantially completely internally reflected from the second, third and fourth clear apertures 122, 124, 126 (or reflectively coated surfaces as required) and finally passes out of the output prism 106 via the fifth clear aperture 128, see FIGS. 3-3D. It can be seen from a review of FIGS. 1 through 3D that when four reflective surfaces are provided in the diverter 102 that the second light plane 110 extends in substantially the same direction as the portion of the first light plane 108 from which it is generated by the diverter 102. For this embodiment of the light diverter 102, the first light plane 108 is blocked in the area of projection of the second light plane 110 and thus, the light planes 108 and 110 are selectively available for construction reference or machine control. The dimensions of one working embodiment of the output prism 106 corresponding to the input prism 104 of FIGS. 2-2C are as follows: H=43 mm; I=68 mm; J=23 mm; K=39 mm; L=106 mm; and M=125 mm.

Figure 4A:
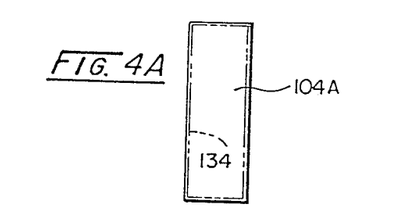
FIGS. 4A–4C and 5A–5D are a two prism construction of a second embodiment of a light diverting orthogonal light plane projector in accordance with the present invention.
Figures 4B, 4C:
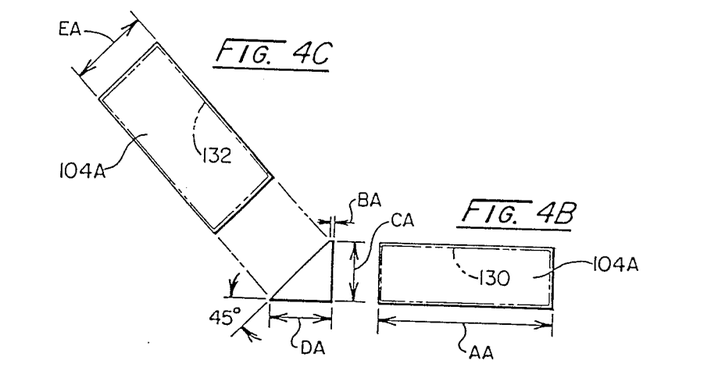
Figure 5A:
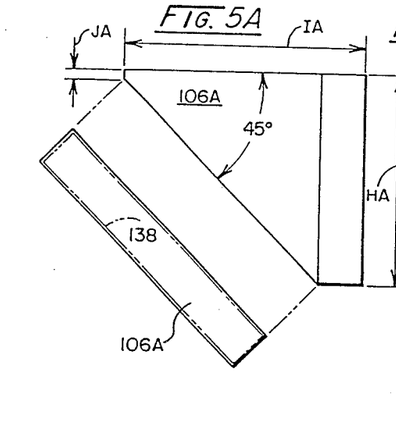
Figure 5B:
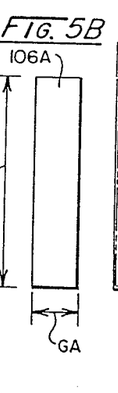
Figure 5C:
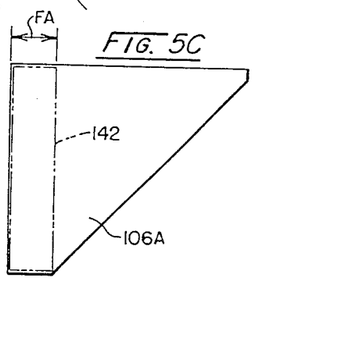
Figure 5D:
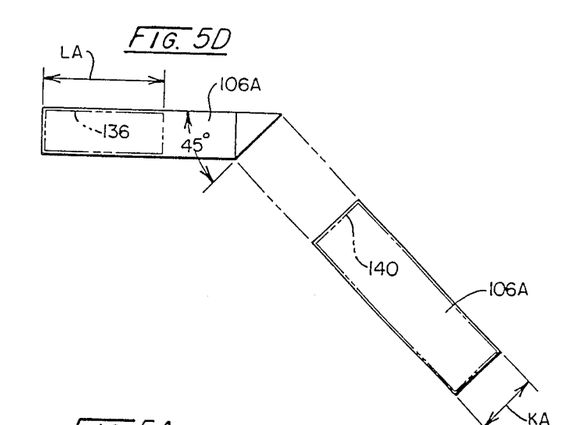

In the embodiment of the diverter 102 shown in FIGS. 4A-4C, 5A-5D and 8, the diverter 102 comprises three reflective surfaces. As shown in FIGS. 4a-4C, an input prism 104A comprises three clear apertures, a first clear aperture 130 through which the portion of the first light plane 108 enters, a second clear aperture 132 which provides substantially complete internal reflection of the received portion of the first light plane 108 such that it passes through the third clear aperture 134. The dimensions of one working embodiment of the input prism 104A are as follows: AA=65 mm; BA=1.5 mm(ref); CA-21.5 mm; DA=23 mm; and EA=30.4 (ref)mm.

As shown in FIGS. 5A-5D and 8, the output prism 106A comprises four clear apertures, a first clear aperture 136 receives light beams from the input prism 104A which is joined to the output prism 106A such that the third clear aperture 134 of the input prism 104A is aligned with and secured to the first clear aperture 136 of the output prism 106A. The prisms 104A, 106A can be joined or secured to one another by ultraviolet cured optical adhesive or by other optical bonding techniques as will be apparent to those skilled in the art. By constructing the diverter 102 as two prisms 104A, 106A, the prisms can be shifted and aligned with one another to calibrate the diverter 102 prior to securing the prisms 104A, 106A together. The remaining clear apertures of the output prism 106A are: a second clear aperture 138; a third clear aperture 140;and, a fourth clear aperture 142.

Light enters the first clear aperture 136 of the output prism 106A from the input prism 104A and is substantially completely internally reflected from the second and third clear apertures 138, 140 and finally passes out of the output prism 106A via the fourth clear aperture 142. It can be seen from a review of FIGS. 4A-4C, 5A-5D and 8 that when three reflective surfaces are provided in the diverter 102 that the second light plane 110 extends in a direction substantially opposite to the direction of the portion of the first light plane 108 from which it is generated by the diverter 102. In this manner, the first light plane 108 and the second light plane 110 are simultaneously available for construction reference and/or for machine control. The dimensions of one working embodiment of the output prism 106A corresponding to the input prism 104A of FIGS. 4A-4C are as follows: FA=23 mm; GA=23 mm; HA=106.5 mm; IA=125 mm; JA=5 mm; KA=32.5 (ref)mm; and LA=64 mm.

As previously noted, a prismatic construction of the diverter 102 is generally preferred since a prismatic construction will normally be smaller than a construction using reflective surfaces positioned, for example, in air due to the larger capture angle and larger exit angle provided by a prismatic diverter of a given size. The enlarged capture and exit angles provided by a prismatic diverter of a given size are due to refraction of light beams as they enter and exit the prismatic diverter 102. Thus, light beams bend or refract when they pass from one medium to another, such as optical glass to air and air to optical glass, if the beams enter the new medium at an angle other than normal to the surface of the new medium. The refraction angle depends on the indices of refraction of the two mediums and the angle of incidence at the surface and is governed by Snell's Law which states:

$$n_1 \sin a_1 = n_2 \sin a_2$$

where $n_1$ is the index or refraction for medium 1, $n_2$ is the index of refraction for medium 2, $a_1$ is the angle of incidence relative to the normal at the interfacing surface between medium 1 and medium 2, and $a_2$ is the angle of refraction relative to the normal as the beam projects from the interfacing surface between medium 1 and medium 2.

Thus, by using a prismatic diverter 102 constructed in accordance with the preceding description and as shown in FIGS. 4A-4C and 5A-5D and using an optical glass having a refractive index (n) equal to 1.51 (BK7), the angular sector 112 of the second light plane 110 extends from light ray 110A at an angle of approximately 4.5° to light ray 110B at an angle of approximately 26°. This can be compared to a diverter 102 constructed of mirrored or other reflective surfaces in air and corresponding to the dimensions recited for the diverter 102 of FIGS. 4A-4C and 5A-5D which would have the angular sector 112 of the second light plane 110 extend from an angle of approximately +3° to approximately −17°.

It is possible in accordance with the present invention to provide the previous angular sector (+4.5° to −26°) of the second light plane 110 with a smaller diverter 102 by constructing the diverter 102 as one or more prisms but of an optical material having a higher index of refraction (n), for example, SFL6 optical glass which has an n=1.786. A higher index prism(s) will allow smaller angles of incidence for light traveling through the prism which results in a smaller size to achieve the same vertical sweep angle or sector 112. Thus, a large variety of constructions are possible for the diverter 102 dependent upon the requirements of the user of the apparatus for projecting light in two orthogonal planes as shown in FIG. 1.

Figure 8:
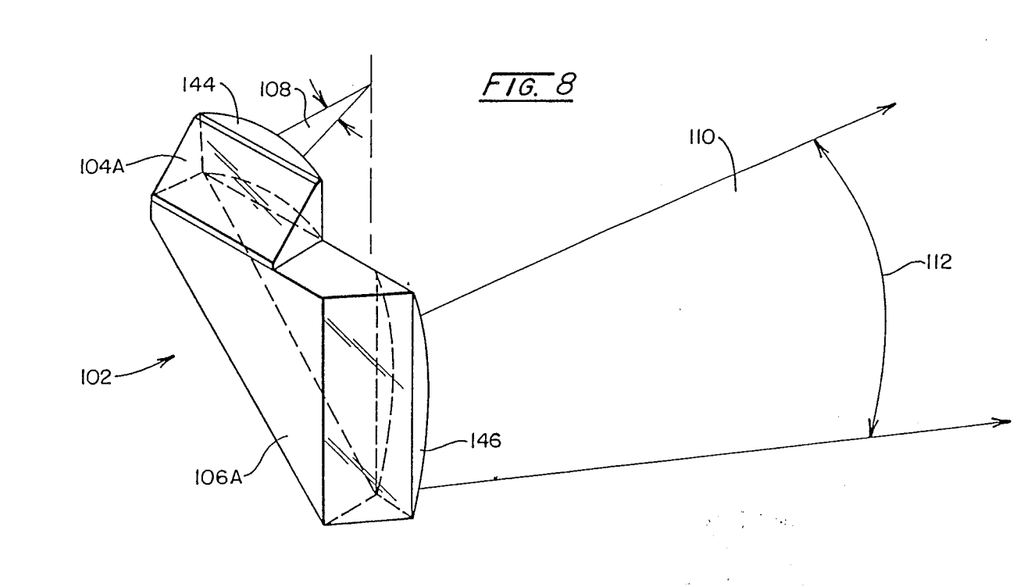
FIG. 8 is a perspective view of the two prism light diverting orthogonal light plane projector of FIGS. 4 and 5 including input and output lenses which form a telescope for the projector.

The angular sector 112 of the second light plane 110 can be further adjusted in accordance with the present invention by providing optical means coupled to the light diverting means for adjusting the sector 112 within which the second light plane 110 is projected. The optical means may comprise a telescope having a first lens 144 coupled to the diverter 102 for receiving the portion of the first light plane 108 therethrough and a second lens 146 coupled to the diverter 102 for projecting the second light plane 110 therethrough as shown in FIG. 8. For this embodiment of the invention, the sector 112 within which the second light plane 110 is projected is defined by the diverter 102 and the first and second lenses 144, 146.

Figure 6:
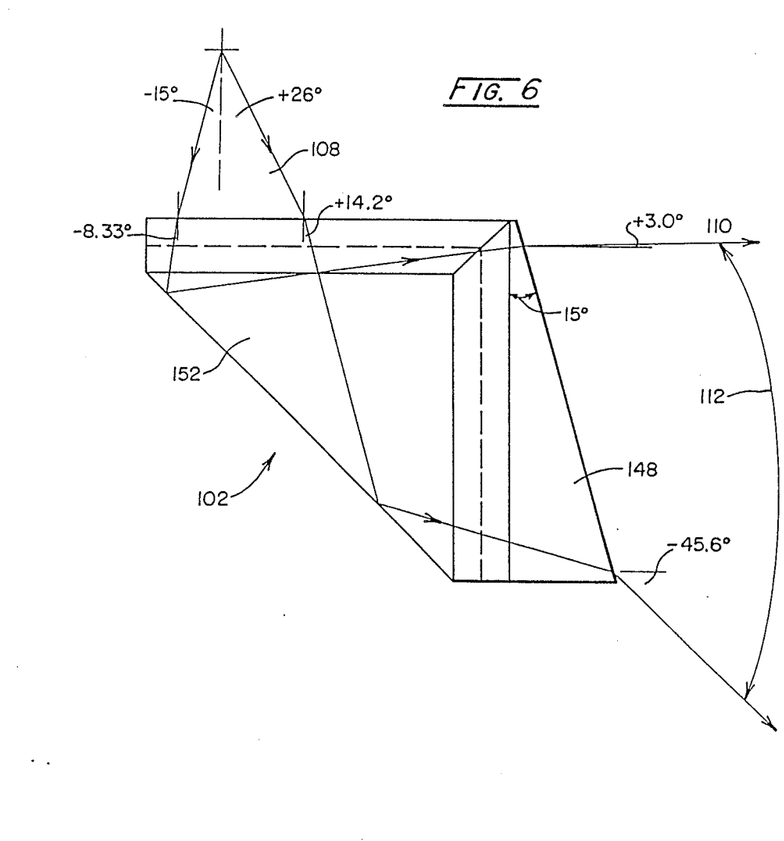
FIG. 6 is a schematic view of a third embodiment of a light diverting orthogonal light plane projector in accordance with the present invention including wedge-shaped optical means at the plane output for downwardly expanding the angular projection sector of the projected orthogonal light plane.
Figure 7:
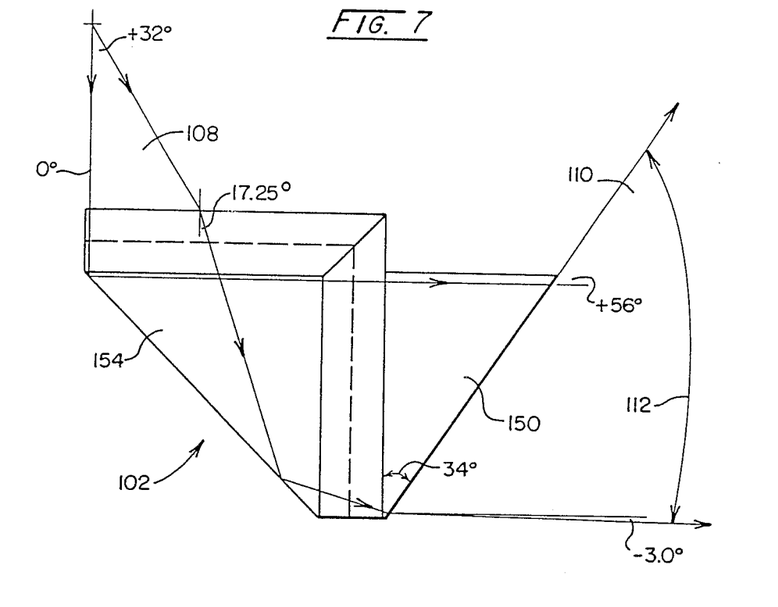
FIG. 7 is a schematic view of a fourth embodiment of a light diverting orthogonal light plane projector in accordance with the present invention including wedge-shaped optical means at the plane output for upwardly expanding the angular projection sector of the projected orthogonal light plane.

Alternately, the optical means may comprise a wedge-shaped section 148, 150 formed of optical material and coupled to the diverter 102 for projecting the second light plane 110 therethrough, the sector within which the second light plane 110 is projected being defined by the diverter 102 and the wedge-shaped section of optical material. The wedge-shaped sections 148, 150 are illustrated in FIGS. 6 and 7 in combination with an alternate prismatic diverter 102 formed of a single prism. The structure and function of the single prism diverters 102 shown in FIGS. 6 and 7 can best be envisioned by noting that they are a single prism equivalent of the two-prism constructions of FIGS. 4, 5 and 8 but with the input prism 104A expanded such that it extends across the entire upper surface of the output prism 106A of those drawing figures.

The optical means may also comprise a first wedge-shaped section formed of optical material coupled to the diverter 102 for receiving the portion of the first light plane 108 therethrough. The sector 112, within which the second light plane 110 is projected, is then defined by the diverter 102 and the first wedge-shaped section. While the first wedge-shaped section is not shown in the drawing figures, it can be easily envisioned as replacing the lens 144 of FIG. 8. The optical means may further comprise a second wedge-shaped section, such as one of the wedge-shaped sections 148 or 150, formed of optical material and coupled to the diverter 102 for projecting the second light plane 110 therethrough. The sector 112 within which the second light plane 110 is projected is then defined by the diverter, the first wedge-shaped section and the second wedge-shaped section.

As shown in FIGS. 6 and 7, the wedge-shaped sections 148, 150 at the output of the diverter 102 revise the angle of incidence of light beams passing from the medium of the prism to air to thus change the refraction angle of light exiting the diverter 102. In this way, the total sweep angle or sector 112 of extension of the second light plane 110 can be changed, typically increased, and pointed by selecting the proper optical means, in the illustrated embodiment, the proper wedge angle of the wedge-shaped sections 148, 150, and by designing the entrance aperture and/or input optical means of the diverter 102 to collect the desired portion of the first light plane 108 or horizontal light plane. Preferably, the wedge-shaped sections 148, 150 can be adjusted relative to the diverter 102 prior to being secured thereto such that the resulting prismatic structure is properly adjusted for vertical calibration.

As shown in FIG. 6, a one-piece prism 152 and wedge-shaped section 148 both constructed of SFL6 optical glass having an index of refraction of n=1.786 are joined using an appropriate optical cement to form a diverter 102. The prism 152 of FIG. 6 is approximately 6.5×6.5×1 inches with the wedge-shaped section 148 being approximately 6.5×1.75×1 inches to increase the vertical sweep angle or sector 112 of the second light plane 110 to approximately +3° and approximately −45.6°. This is possible in accordance with the present invention in a small prismatic diverter which allows users vertical alignment capability at closer ranges, as near as five (5) feet. The use of a wedge-shaped section(s) also permits diverters constructed in accordance with the present invention to be able to generate the second light plane 110 in an upward extension from horizontal rather than just being able to sweep or project downwardly from horizontal.

Such upward sweeping or projection is illustrated in FIG. 7 wherein a one-piece prism 154 measuring approximately 5×5×1 inches is coupled to a wedge-shaped section 150 measuring approximately 4.25×3×1 inches to sweep or project the second light plane 110 in the sector 112 extending from approximately +56° to approximately −3°. The prism 154 and wedge-shaped section 150 are constructed of SFL6 optical glass.

Figure 9:
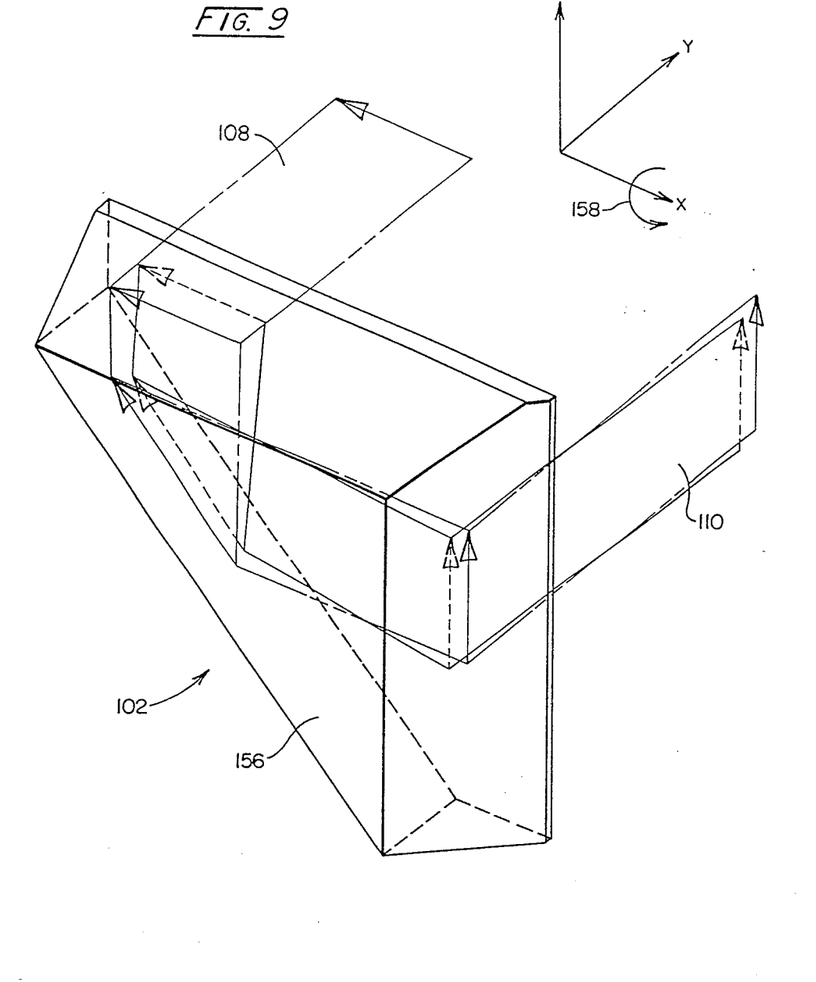
FIGS. 9 and 10 are perspective views of prismatic light diverting orthogonal light plane projectors illustrating compensation and sector changes for tilt errors of the projector due to rotation about the x-axis and the y-axis, respectively.
Figure 10:
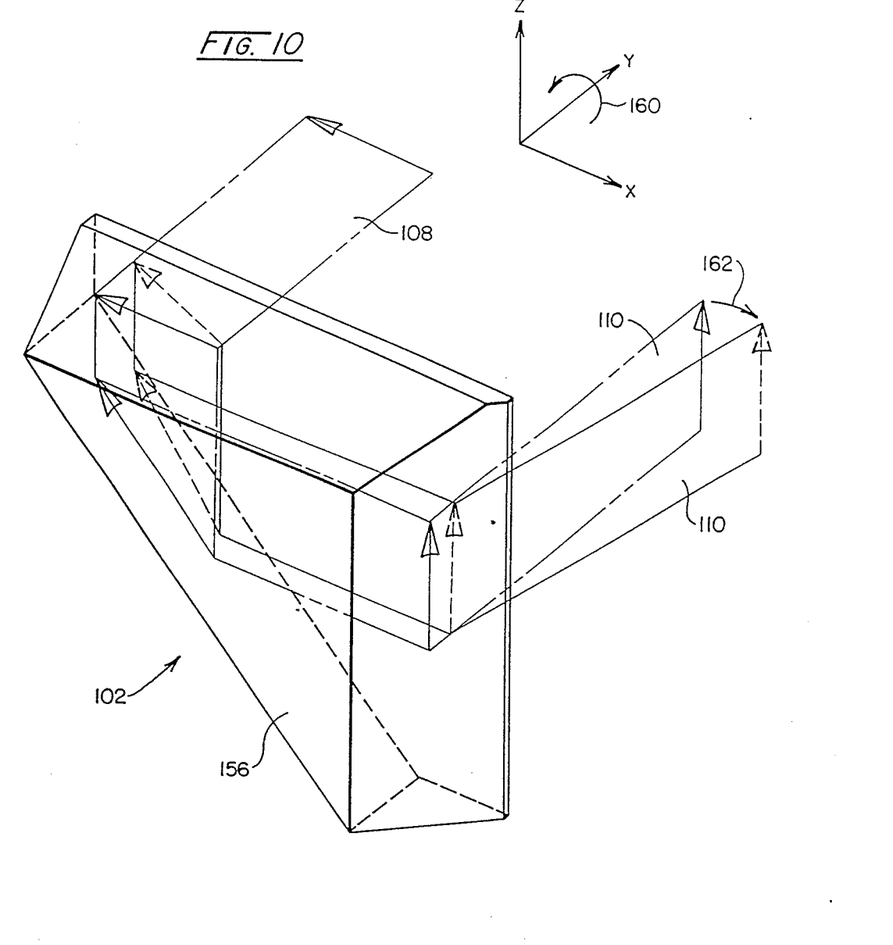

FIGS. 9 and 10 are perspective views of prismatic light diverting orthogonal light plane projectors or diverters 102 illustrating compensation and sector changes for tilt errors of the diverters 102 due to rotation about the x-axis and the y-axis, respectively. The diverters 102 of FIGS. 9 and 10 are once again shown as one-piece prisms 156 which are substantially the same as the prisms 152 and 154 of FIGS. 6 and 7. The illustrated embodiments of the present invention include diverters 102 which include three or four reflective surfaces although more than four reflective surfaces can also be provided. The compensation performed by the diverters 102 is most easily envisioned by thinking of the four reflective surface embodiment as comprising two "pentaprisms" which are oriented out of plane relative to one another such that tilt errors introduced by rotation about a first axis and due to one of the pentaprisms are compensated or cancelled by the other pentaprism. Rotation about a second axis orthogonal to the first axis shifts the plane but only the projection sector 112 not the orthogonality of the first light plane 108 and the second light plane 110.

As shown in FIG. 9, if the diverter 102 is tilted about the x-axis as shown by the arrow 158, the dotted line image results and is offset down and parallel to the level solid line image. If rotated in the opposite direction about the x-axis, the image is offset up and parallel to the level solid line image. Thus, tilting about the x-axis results in shifts in the projection sector 112 of the second light plane 110. As shown in FIG. 10, if the diverter 102 is tilted about the y-axis as shown by the arrow 160, the dotted line image results and is offset from the solid line image by the angle 162. If rotated in the opposite direction, the image is offset in the opposite direction. However, the dotted line image is still orthogonal to the input image, i.e. the second light plane 110 is generated or projected orthogonal to the first light plane 108, and the offset errors over the range of tolerable tilt angles are also so small as to be of no concern. If not for the compensation of the diverter 102 of the present invention, skew errors typically at a ratio of one-to-one would be generated by tilting about either the x-axis or the y-axis such that the second light plane 110 would be skewed relative to an orthogonal projection of the first light plane 108.

Figure 11:
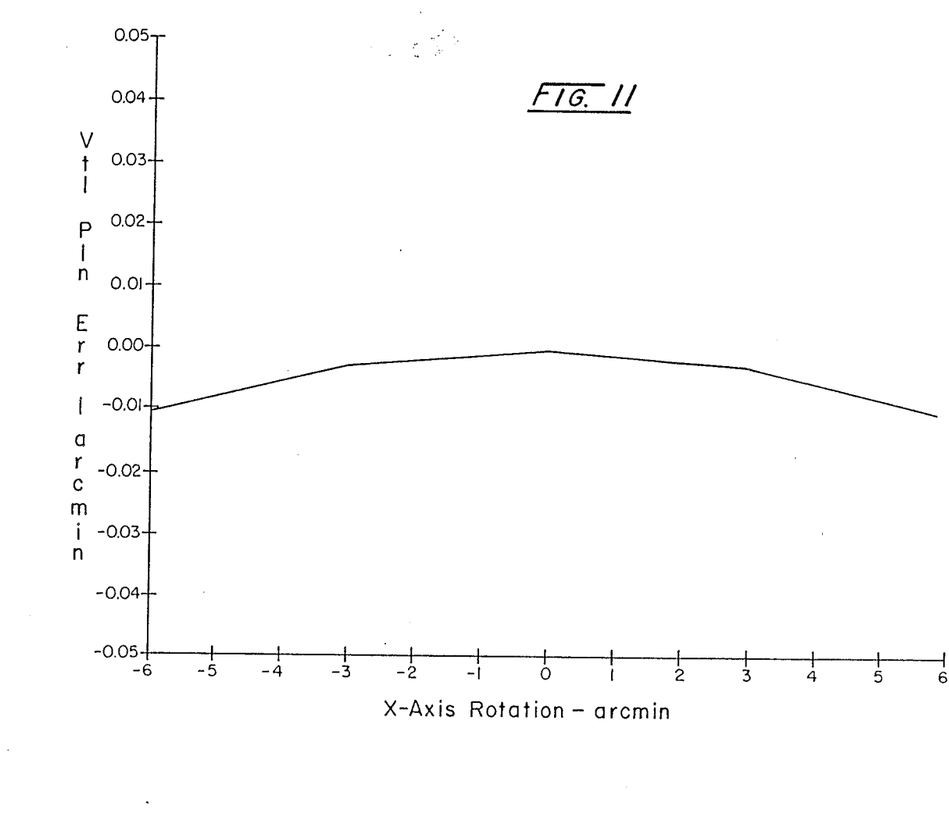
FIG. 11 is a graph of secondary compound angle errors which remain due to tilt errors of the projector in spite of the substantial compensation which is afforded by the present invention.

Even though tilt angles are thus compensated in accordance with the present invention such that orientation of the diverter 102 relative to the reference light plane generator 100 is not critical, there is a residual error, specifically with tilting about the x-axis. The residual error is a "compound angle" error resulting from the combined effects of tilting more than one reflective surface simultaneously within the system and, while varying with angle, the residual error is 100 to 1000 times smaller than the actual tilt error in typical applications. The optimal compound angle error for tilting about the x-axis of one configuration of the diverter 102 is illustrated in the graph of FIG. 11. For y-axis tilting there is no error provided error is understood to mean that the first and second light planes 108, 110 are no longer orthogonal to one another although there is a line angular shift equal to the tilt error. It is to be understood that the compound angle error illustrated in FIG. 11 may deteriorate, although not appreciably or unacceptably, for compensated manufacturing errors and calibration errors. It is also conceivable that some wedge-shaped sections and lenses, particularly cylindrical lenses, may reduce the performance of the diverter 102; however, here again reduced performance should not be unacceptable for typical applications of the diverter 102.

Having thus described the orthogonal light plane projector of the present invention in detail and by reference to preferred embodiments thereof, it will be apparent that modifications and variations are possible without departing from the scope of the invention defined in the appended claims.

What is claimed is:

1. Apparatus for projecting light in two orthogonal planes to provide reference planes for use in laying out a construction site or the like, said apparatus comprising:

light source means for generating a first light plane; and light diverting means for receiving a portion of said first light plane generated by said light source means and transforming the received portion of said first light plane to a second light plane which is orthogonal to said first light plane and is projected within an angular sector defined by said light diverting means, said light diverting means comprising at least three reflective surfaces oriented relative to one another such that tilting said light diverting means about a first axis is compensated to maintain said second light plane orthogonal to said first light plane and tilting said light diverting means about a second axis orthogonal to said first axis alters the sector within which said second light plane is projected but not the orthogonality of said first and second light planes.

2. Apparatus for projecting light in two orthogonal planes as claimed in claim 1 further comprising optical means coupled to said light diverting means for adjusting the sector within which said second light plane is projected.

3. Apparatus for projecting light in two orthogonal planes as claimed in claim 2 wherein said optical means comprises a telescope having a first lens coupled to the light diverting means for receiving the portion of said first light plane therethrough and a second lens coupled to the light diverting means for projecting said second light plane therethrough, the sector within which said second light plane is projected being defined by said light diverting means and said first and second lenses.

4. Apparatus for projecting light in two orthogonal planes as claimed in claim 2 wherein said optical means comprises a wedge shaped section of optical material coupled to the light diverting means for projecting said second light plane therethrough, the sector within which said second light plane is projected being defined by said light diverting means and said wedge shaped section.

5. Apparatus for projecting light in two orthogonal planes as claimed in claim 2 wherein said optical means comprises a first wedge shaped section of optical material coupled to the light diverting means for receiving the portion of said first light plane therethrough, the sector within which said second light plane is projected being defined by said light diverting means and said first wedge shaped section.

6. Apparatus for projecting light in two orthogonal planes as claimed in claim 5 wherein said optical means further comprises a second wedge shaped section of optical material coupled to the light diverting means for projecting said second light plane therethrough, the sector within which said second light plane is projected being defined by said light diverting means, said first wedge shaped section and said second wedge shaped section.

7. Apparatus for projecting light in two orthogonal planes as claimed in claim 1 wherein said light diverting means comprises two pairs of reflective surfaces, a first pair of reflective surfaces for receiving said portion of said first light plane and passing it to a second pair of reflective surfaces which receive light from said first pair of reflective surfaces and project it as said second light plane.

8. Apparatus for projecting light in two orthogonal planes as claimed in claim 7 wherein said light diverting means comprises an input prism defining one of said reflective surfaces and an output prism defining second, third and fourth reflective surfaces, said input and output prisms being secured to one another in proper alignment.

9. Apparatus for projecting light in two orthogonal planes as claimed in claim 1 wherein said light diverting means comprises three reflective surfaces, a first of said reflective surfaces for receiving said portion of said first light plane, a second of said reflective surfaces for projecting said second light plane, and a third of said reflective surfaces for receiving light from said first reflective surface and reflecting it to said second reflective surface.

10. Apparatus for projecting light in two orthogonal planes as claimed in claim 9 wherein said light diverting means comprises an input prism defining one of said reflective surfaces and an output prism defining said second and third reflective surfaces, said input and output prisms being secured to one another in proper alignment.

11. Apparatus for projecting light in two orthogonal planes to provide orthogonal reference light planes for use in laying out a construction site or the like, said apparatus comprising:
light source means for generating a first light plane; and
prismatic light diverting means for receiving a portion of said first light plane generated by said light source means and transforming the received portion of said first light plane to a second light plane which is orthogonal to said first light plane.

12. Apparatus for projecting light in two orthogonal planes as claimed in claim 11 further comprising optical means coupled to said prismatic light diverting means for adjusting the sector within which said second light plane is projected.

13. Apparatus for projecting light in two orthogonal planes as claimed in claim 12 wherein said optical means comprises a telescope having a first lens coupled to said prismatic light diverting means for receiving the portion of said first light plane therethrough and a second lens coupled to said prismatic light diverting means for projecting said second light plane therethrough, the sector within which said second light plane is projected being defined by said prismatic light diverting means and said first and second lenses.

14. Apparatus for projecting light in two orthogonal planes as claimed in claim 12 wherein said optical means comprises a wedge shaped section of optical material coupled to said prismatic light diverting means for projecting said second light plane therethrough, the sector within which said second light plane is projected being defined by said prismatic light diverting means and said wedge shaped section.

15. Apparatus for projecting light in two orthogonal planes as claimed in claim 12 wherein said optical means comprises a first wedge shaped section of optical material coupled to the prismatic light diverting means for receiving the portion of said first light plane therethrough, the sector within which said second light plane is projected being defined by said prismatic light diverting means and said first wedge shaped section.

16. Apparatus for projecting light in two orthogonal planes as claimed in claim 15 wherein said optical means further comprises a second wedge shaped section of optical material coupled to said prismatic light diverting means for projecting said second light plane therethrough, the sector within which said second light plane is projected being defined by said prismatic light diverting means, said first wedge shaped section and said second wedge shaped section.

17. Apparatus for projecting light in two orthogonal planes as claimed in claim 11 wherein said prismatic light diverting means comprises two pairs of reflective surfaces, a first pair of reflective surfaces for receiving said portion of said first light plane and passing it to a second pair of reflective surfaces for receiving light from said first pair of reflective surfaces and projecting said second light plane.

18. Apparatus for projecting light in two orthogonal planes as claimed in claim 17 wherein said second light plane is projected within a sector, and said first and second pairs of reflective surfaces are oriented relative to one another such that skew errors resulting from tilting said prismatic light diverting means about a first axis are compensated by said first and second pairs of reflective surfaces and offset errors resulting from tilting said prismatic light diverting means about a second axis orthogonal to said first axis alter the sector within which said second light plane is projected.

19. Apparatus for projecting light in two orthogonal planes as claimed in claim 11 wherein said prismatic light diverting means comprises three reflective surfaces, first and second ones of said three reflective surfaces forming a first pair of reflective surfaces for receiving said portion of said first light plane, and said second reflective surface and a third reflective surface forming a second pair of reflective surfaces for projecting said second light plane.

20. Apparatus for projecting light in two orthogonal planes as claimed in claim 19 wherein said second light plane is projected within a sector, and said first and second pairs of reflective surfaces are oriented relative to one another such that skew errors resulting from tilting said prismatic light diverting means about a first axis are compensated by said first and second pairs of reflective surfaces and offset errors resulting from tilting said prismatic light diverting means about a second axis orthogonal to said first axis alter the sector within which said second light plane is projected.

21. Apparatus for transforming a portion of an input light plane to an output light plane which is orthogonal to said input light plane, said apparatus comprising:
   a first pair of reflective surfaces for receiving the portion of said input light plane; and
   a second pair of reflective surfaces for receiving light from said first pair of reflective surfaces and projecting said light as said second light plane.

22. Apparatus for transforming an input light plane to an output light plane which is orthogonal to said input light plane as claimed in claim 21 wherein said output light plane is projected within a sector, and said first and second pairs of reflective surfaces are oriented relative to one another such that skew errors resulting from tilting said apparatus about a first axis are compensated by said first and second pairs of reflective surfaces and offset errors resulting from tilting said apparatus about a second axis orthogonal to said first axis alter the sector within which said second light plane is projected.

* * * * *